US012797779B2

(12) United States Patent
Radermacher et al.

(10) Patent No.: US 12,797,779 B2
(45) Date of Patent: Nov. 17, 2026

(54) METHOD FOR INTERMITTENTLY CLEANING A FILTER, AND FILTER DEVICE FOR A METAL PRINTING DEVICE

(71) Applicant: Becker Additive Manufacturing Solutions GmbH, Puchheim (DE)

(72) Inventors: Bernhard Radermacher, Korschenbroich (DE); Christian Radau, Schwelm (DE)

(73) Assignee: Becker Additive Manufacturing Solutions GmbH, Puchheim (DE)

( * ) Notice: Subject to any disclaimer, the term of this patent is extended or adjusted under 35 U.S.C. 154(b) by 880 days.

(21) Appl. No.: 17/770,134

(22) PCT Filed: Nov. 17, 2020

(86) PCT No.: PCT/EP2020/082329
§ 371 (c)(1),
(2) Date: Apr. 19, 2022

(87) PCT Pub. No.: WO2021/104927
PCT Pub. Date: Jun. 3, 2021

(65) Prior Publication Data

US 2022/0362691 A1 Nov. 17, 2022

(30) Foreign Application Priority Data

Nov. 28, 2019 (DE) ..................... 10 2019 132 349.5

(51) Int. Cl.
*B01D 29/66* (2006.01)
*B01D 46/48* (2006.01)
*B01D 46/70* (2022.01)

(52) U.S. Cl.
CPC ............. *B01D 29/66* (2013.01); *B01D 46/48* (2013.01); *B01D 46/70* (2022.01)

(58) Field of Classification Search
CPC ................ B01D 29/66; B01D 46/0093; B01D 46/2403; B01D 46/48; B01D 46/69; B01D 46/70; B01D 2273/28; Y02P 10/25
See application file for complete search history.

(56) References Cited

U.S. PATENT DOCUMENTS

| | | | | |
|---|---|---|---|---|
| 2,544,244 A * | 3/1951 | Vokes | B01D 35/153 210/303 |
| 6,394,708 B1 * | 5/2002 | Braden | B65G 53/60 406/173 |
| 8,794,263 B2 | 8/2014 | Scott et al. | |
| 10,697,298 B2 | 6/2020 | Kraft et al. | |
| 2003/0075085 A1 * | 4/2003 | Kroemmer | B65D 90/587 110/165 R |
| 2006/0027267 A1 * | 2/2006 | Fritze | F25D 23/126 62/189 |
| 2010/0300298 A1 * | 12/2010 | Holzmann | B01D 46/10 96/396 |
| 2011/0252765 A1 * | 10/2011 | Makartchouk | F02D 9/06 60/274 |
| 2011/0265893 A1 * | 11/2011 | Scott | B01D 46/90 137/544 |
| 2014/0223690 A1 * | 8/2014 | Witter | B01D 46/71 15/353 |
| 2014/0299290 A1 * | 10/2014 | Truemper | F25B 21/04 165/42 |
| 2016/0207147 A1 * | 7/2016 | Van Hassel | B22F 12/70 |
| 2018/0244034 A1 * | 8/2018 | Sutcliffe | B29C 64/255 |
| 2021/0023490 A1 | 1/2021 | Kleemann et al. | |
| 2021/0122117 A1 | 4/2021 | Schade et al. | |

FOREIGN PATENT DOCUMENTS

| | | | | |
|---|---|---|---|---|
| CN | 202595175 U * | 12/2012 | | |
| DE | 10 2012 004 587 A1 | 9/2013 | | |
| DE | 20 2012 013 036 U1 | 8/2014 | | |
| DE | 10 2015 107 721 A1 | 11/2016 | | |
| DE | 10 2015 118 746 A1 | 5/2017 | | |
| DE | 10 2017 206 792 A1 | 10/2018 | | |
| DE | 102017207415 A1 | 11/2018 | | |
| DE | 102018002314 A1 * | 9/2019 | ............. | B01D 46/58 |
| DE | 102020102034 A1 | 5/2021 | | |
| WO | 2021151681 A1 | 8/2021 | | |
| WO | 2021151938 A1 | 8/2021 | | |

OTHER PUBLICATIONS

International Search Report of PCT/EP2020/082329, mailed Feb. 2, 2021.
International Search Report of International Application No. PCT/EP2022/065451 (English translation).

* cited by examiner

*Primary Examiner* — Krishnan S Menon
*Assistant Examiner* — Tak L. Chiu
(74) *Attorney, Agent, or Firm* — Collard & Roe, P.C.

(57) ABSTRACT

The invention relates to a method for intermittently cleaning a filter in a filter device, which filter device comprises a filter housing and the filter located therein. The filter housing has a medium inlet and a medium outlet for a medium to be filtered. During filter operation, the medium flowing through the medium inlet passes through the filter and exits the filter device via the medium outlet. In order to clean the filter, both the medium inlet and the medium outlet are closed and a negative pressure is produced in the filter housing and a flushing medium is sucked into the filter housing by the negative pressure.

24 Claims, 14 Drawing Sheets

METHOD FOR INTERMITTENTLY CLEANING A FILTER, AND FILTER DEVICE FOR A METAL PRINTING DEVICE

CROSS REFERENCE TO RELATED APPLICATIONS

This application is the National Stage of PCT/EP2020/082329 filed on Nov. 17, 2020, which claims priority under 35 U.S.C. § 119 of German Application No. 10 2019 132 349.5 filed on Nov. 28, 2019, the disclosure of which is incorporated by reference. The international application under PCT article 21(2) was not published in English.

TECHNICAL FIELD

The invention relates in the first instance to a method for intermittently cleaning a filter in a filter device, which filter device comprises a filter housing and the filter located therein, wherein the filter housing has a medium inlet and a medium outlet for a medium to be filtered, wherein, furthermore, during filter operation, the medium flowing through the medium inlet passes through the filter and exits the filter device via the medium outlet.

The invention further relates to a method for operating a metal printing device having an enclosure in which the metal printing is carried out, wherein the enclosure has an inlet and an outlet, and further wherein a fan is provided by means of which an atmosphere in the enclosure can be regenerated, for which purpose a filter device is provided for regenerating the atmosphere.

In addition, the invention relates to a filter device for a metal printing device having an enclosure in which the metal printing is carried out, wherein the filter device comprises a filter housing having a filter located therein for a medium to be filtered in a filter operation of the filter device, and a medium inlet and a medium outlet for the medium to be filtered.

PRIOR ART

In the case of metal printing devices such as, for example, laser sintering or laser melting devices, further, for example, so-called 3D laser printing devices, it is known to supply process gas to the enclosure of the printing device using a circulation process, which process gas is cleaned or regenerated with regard to impurities (for example, flue gas) which occur during the metal printing process, in particular due to the high heat effect, and which can occur in particular due to the laser application.

The production of a printing piece in the metal printing device is preferably carried out in an inert gas atmosphere achieved by a process gas. For example, an inert gas such as argon or nitrogen is generally used as the process gas, wherein, more preferably, argon or nitrogen is used as the sole gas. In principle, however, a mixture of gases, thus inert gases in particular, can also be present as the process or inert gas. As a rule, the aim is for the atmosphere to contain no oxygen or virtually no oxygen, in particular in the enclosure. Thus, in the case of the metal printing device, the medium flowing through the filter device is the process gas.

Depending on the size and/or complexity of the printing piece to be produced, such a printing process may well extend over several hours up to several days.

A metal printing device is known, for example, from DE 10 2017 206 792 A1. In connection with a filter device, such a metal printing device has become known, for example, from DE 20 2012 013 036 U1. A method for cleaning a filter is known from DE 10 2015 118 746 A1.

A process for intermittent cleaning of a filter is known from DE 10 2018 002 314 A1, in which cleaning is performed by an oil filling. For cleaning, the oil filling flows through both a filtered material collecting chamber and the filter housing. It is also possible to shut off one of several filter devices and remove it from regeneration mode. In this case, however, there are disadvantages with regard to the operation of the metal printing device. The filtered material collecting chamber is permanently connected to the filter device, also with regard to a common throughflow in the case of an oil filling. The filtered material collecting chamber is also connected to the filter device in a permanently fixed manner.

Furthermore, with respect to the prior art, reference is made to U.S. Pat. No. 8,794,263 B2 and to DE 10 2012 004 587 A1.

SUMMARY OF THE INVENTION

Proceeding from a prior art according to DE 10 2018 002 314 A1, the invention is concerned with the object to provide an advantageous method for intermittently cleaning a filter as well as an advantageous filter device. In addition, it is the object of the invention to provide an advantageous method for operating a metal printing device.

This object is achieved with regard to the method for intermittently cleaning a filter, wherein it is intended that the filter device has a filtered material collecting chamber and that before the flushing medium is sucked into the filter housing, the filtered material collecting chamber is closed off in order to maintain the negative pressure in the filtered material collecting chamber.

This object is further achieved with regard to the method for operating a metal printing device, wherein it is intended that the removal of a filter device for cleaning the filter in the filter device is accompanied by an increase in the volume flow in the remaining filter device, wherein the removal is carried out in a timed manner such that a predetermined limit value with regard to a volume flow increase or volume flow decrease is not exceeded.

With regard to the filter device for a metal printing device, the object is in the first instance achieved, wherein it is provided that the filter device has a filtered material collecting chamber assigned to the filter housing, that the filtered material collecting chamber can be shut off, and that a discharge valve is provided for shutting off between the filtered material collecting chamber and the filter, and furthermore, wherein it is provided that the filter device has a filtered material collecting chamber assigned to the filter housing, and that the filtered material collecting chamber can be removed from the filter housing.

For cleaning the filter, the filter device in question is accordingly preferably fluidically separated from the device connected via the medium inlet and the medium outlet, such as a metal printing device. In the filter housing, which is (initially) sealed off from the environment and the further device(s), a negative pressure is produced by evacuating the interior. This negative pressure can be only several hundred millibars (e.g. 100 to 500 mbar absolute) or can also be comparatively high (e.g. up to 1 mbar absolute).

At least by using this negative pressure in the filter housing, a flushing medium for cleaning the filter can be introduced due to a resulting suction effect. Through this suction effect, an effective throughflow through the filter, in particular through a filter wall, is achieved. In addition, the flushing medium can be injected under pressure into the interior of the filter housing for pressurizing the filter in order to further improve filter cleaning.

As a result of the proposed solution, advantageous cleaning of the filter, in particular of a filter wall of the filter, is achieved.

The filter device for the metal printing device can be designed such that an interior of the filter housing can be shut off for producing a negative pressure. Shutoff can be achieved, for example, by conventional slide valve or valve arrangements. The filter housing can be prepared for cleaning the filter accommodated therein at least to the extent that the interior of the filter housing can be evacuated.

In order to achieve improved cleaning of a filter in a filter device, the filter housing, in addition to the medium inlet and the medium outlet, can have a flushing medium inlet, which can be shut off, for introducing a flushing medium into the interior of the filter housing during cleaning operation. As a result of flow reversal, this makes it possible not to use the medium flowing through the filter in normal operation or, alternatively, to use it not only for cleaning the filter, but rather to introduce a separate medium (flushing medium) which, if necessary, may serve solely for cleaning the filter. For this purpose, as is also preferred, a separate flushing medium inlet can be provided.

For an advantageous configuration of an operation of a metal printing device, it is provided in the case of two or more filter devices, each having one filter, which are operated in parallel, to shut off this filter device to be cleaned for cleaning a filter device and to remove it from the regeneration mode and to operate it with a flushing medium. This makes it possible to maintain continuous operation of the metal printing device, even over a longer period of time, although it is not necessary to provide a filter device which is designed to clean the atmosphere or the process gas over the entire period of operation of the metal printing device for the production of a specific product using the metal printing method. During the cleaning of the filter device, the other or the plurality of further filter devices may be further penetrated by the process gas for filtering.

As a result of this method, continuous operation of the metal printing device is possible despite filter cleaning. This has proved to be an advantage in particular for metal printing processes that last several hours or days. For this purpose, the filter device to be cleaned is removed from the operating circuit by shutting it off. The one further filter device or the plurality of further filter devices take over the filtering of the medium flowing through the enclosure of the metal printing device during the cleaning operation of the filter device which has been shut off.

In a possible configuration for cleaning the filter it is provided that the flushing medium is introduced in a direction opposite to the filter operation. In cleaning operation, the flushing medium can substantially pass through a filter wall, for example, from the inside to the outside, while in filter operation, the medium to be filtered flows substantially from the outside to the inside through the filter wall. The flushing medium passing through the filter during filter operation, in any case against the direction of flow, thus advantageously loosens the filtered material deposited on or in the filter wall and transports it away, possibly as a result of the flow.

As an alternative to or also in combination with a flow of the flushing medium in a direction opposite to the usual direction of flow in filter operation, the flushing medium can also be directed to a side of the filter wall representing an outer side of the filter wall in filter operation for cleaning the filter. Furthermore, in doing so, the direction of flow of the flushing medium can be directed, for example, substantially transversely to the direction of flow of the medium during filter operation. In this way, a supporting effect of the cleaning effect, in particular a removal effect, can be achieved.

The filter element can have a filtered material collecting chamber assigned to the filter housing. This collecting chamber can be designed, as is also preferred, for receiving filtered material that has been removed from the filter, in particular in the course of the cleaning process. In the usual operating orientation of the filter device, the filtered material collecting chamber can be arranged, for example, at the bottom of the filter housing and, if necessary, can also receive particles of filtered material loosened or separated from the medium to be filtered during the usual filter operation.

According to a further possible configuration, the arrangement of the filter collecting housing on the filter housing can be selected such that it can be subjected to negative pressure together with the filter housing. Evacuation of the interior of the filter housing can correspondingly lead to an evacuation of the interior of the filter collecting housing, for example due to an open transition between the filter housing and the collecting housing.

The filtered material collecting chamber can be shut off with respect to the filter housing, in particular the interior of the filter housing. After such a shutoff, according to a preferred configuration, the air pressure prevailing in the filtered material collecting chamber before the shutoff is carried out is maintained in the filtered material collecting chamber, thus, more preferably, the negative pressure achieved before shutting off due to evacuation.

For shutting off between the filter material collecting chamber and the filter or the filter housing, a discharge valve can be provided. In the open position of the discharge valve, filtered material can pass from the interior of the filter housing into the filtered material collecting chamber. The filtered material can thereby fall into the filtered material collecting chamber in a simple gravity-dependent manner.

According to a further preferred configuration, after pressure equalization in the interior of the filter housing by the sucked-in and possibly blown-in flushing medium, this access to the filtered material collecting chamber can be opened for receiving filtered material into the filtered material collecting chamber. The negative pressure in the filter material collecting chamber, which was previously maintained by the hermetic sealing of the filtered material collecting chamber with respect to the interior of the filter housing containing the filter to be cleaned, can be used to suck loosened filtered material into the collecting chamber. In the course of the cleaning process, the filtered material can accumulate, for example, at the bottom of the filter housing, and furthermore, for example, in the region of the discharge valve, as a result of the flushing medium acting on the filter wall. Upon opening the discharge valve, exhausting the interior of the housing and suction into the collecting chamber can be achieved.

In an advantageous manner, the filtered material collecting chamber can be removed from the filter housing. Accordingly, in this regard, a screw or plug-in connector of the collecting chamber can be provided on the filter housing, for example, and more preferably a connector that can be operated without tools. The filtered material collecting chamber can thus be transported for disposal of the filtered material.

Furthermore, a shutoff valve can be provided for closing the filtered material collecting chamber. In this regard, it can be a separate valve from the aforementioned discharge valve, so that after removal of the collecting chamber from the filter housing, in a preferred configuration, both the collection chamber is closed by the shutoff valve and the filter housing is closed by, for example, the correspondingly preferred discharge valve attached to the filter housing. According to a possible configuration, the shutoff valve at the collecting chamber can be opened for emptying the collection chamber.

In the arrangement position of the filtered material collecting chamber on the filter housing, the shutoff valve can be held in a valve-open position. Accordingly, the shutoff valve can be, for example, a mechanically acting valve which, in the arrangement position on the filter housing, is correspondingly acted upon into an open position. In an exemplary configuration, the shutoff valve, if applicable designed as a butterfly valve, can be provided with a mandrel extending from the filter housing against the force of a spring acting on the shutoff valve. Thus, it can be ensured that, in the usual operating position, the shutoff valve is held in the open position and a shutoff of an interior of the filtered material collecting chamber can preferably be achieved solely by the discharge valve which, if necessary, can also be provided.

Moreover, upon removal of the filtered material collection chamber from the filter housing, the shutoff valve can preferably be displaced in a spring-supported manner into a closed position. Upon removal of the filtered material collecting chamber from the filter housing, the preferred support of the shutoff valve for keeping the same open is no longer present. A spring acting on the valve or on the valve body can displace the valve body into the closed position in the absence of support. This ensures that when the filtered material collecting chamber is removed, the latter is closed without further intervention by the user.

A medium different from the medium to be filtered can be used as the flushing medium. Alternatively, the flushing medium corresponds to the medium to be filtered, so that, for example, argon or nitrogen can be used as the flushing medium, with the advantage that the flushing medium can remain in the system after the flushing process and after the filter device has been reinstalled in the filter circuit.

To build up the negative pressure in the filtered material collecting chamber as well as in the interior of the filter housing comprising the filter, a preferably electrically operated vacuum pump can be provided, for example.

In one possible design, two flushing medium inlets can be provided, one of which causes flushing medium to pass through the filter wall in a direction opposite to the filter operation, and one of which causes the flushing medium to be directed to the outside of the filter wall. The activation of the flushing medium inlets can be selected such that both flushing medium inlets introduce flushing medium simultaneously and, if necessary, over the same period of time. Also, the flushing medium inlets can alternately and furthermore, if necessary, successively spray flushing medium onto the filter to be cleaned.

Thus, each flushing medium inlet can further be assigned one control valve in each case. These control valves can be controllable with respect to their opening and closing positions or times via control electronics provided. In this context, pneumatically actuated control valves are particularly suitable. Alternatively, however, electrically or hydraulically actuated valves are also conceivable.

The medium inlet and the medium outlet are each assigned one shutoff valve in order to achieve a line separation between the filter device and a device connected via a line, such as in particular the aforementioned metal printing device, with respect to the device and the medium flowing through the filter device, that is, for example, a process gas. For example, after closing the shutoff valves in the medium inlet and medium outlet, the filter device can be removed from the medium circuit.

With respect to the shutoff valves described above, the valves can be pneumatically controllable valves. Alternatively, electrically or hydraulically controllable valves can also be provided in this respect.

In the case of pneumatic control valves and/or shutoff valves, they can be actuated using the flushing medium, for example.

In order to keep the volumetric flow of the medium, in particular the volumetric flow of the process gas through the metal printing device, optionally an enclosure of the metal printing device, constant or at least approximately constant when a filter device is removed from the regeneration mode, the fan generating the volumetric flow is continuously controlled via a preferably integrated volumetric flow measurement. The removal of a filter device for cleaning the filter in the filter device, without an adjustment of the volume flow, for example by a control, is in the first instance accompanied by an increase in the volume flow in the remaining filter device. Preference is therefore given to a control of the volume flow in this respect. In addition to controlling the volume flow, for example by controlling the fan generating the volume flow, the removal of the filter device to be cleaned is preferably timed such that a predetermined limit value with regard to an increase or decrease in volume flow is not exceeded. Such a limit value can range from, for example, one tenth to one quarter of the regular volume flow. Here, a volume flow correlates also to a mass flow, so that the measurement of a mass flow can be relied upon as a basis for volume flow control, for example.

For this purpose, a preferably controllable throttle valve can be arranged in the medium outlet, which throttle valve, before the filter device is removed, reduces the flow rate so slowly that the volume flow control can reliably readjust the fan.

A filter module can be provided, wherein, for example, two or more filter devices each having one filter can be provided in the filter module, thus, furthermore, three, four or five filter devices, for example. The filter module, in which preferably further units, such as a flushing medium reservoir and/or a fan, can be arranged, can advantageously be connected to the further device, such as in particular the metal printing device, at a simplified interface.

In the case of an arrangement of multiple filter devices in a filter module, they are preferably connected in parallel with regard to their inlet and outlet piping, which, after a shutoff in the region of a medium inlet and a medium outlet, also enables the shut-off filter device to be removed from the regeneration mode. In this shut-off position of the filter device, the filter can be cleaned with the flushing medium.

A separate flushing medium reservoir can be assigned to the filter device or to the filter module comprising multiple filter devices. From this reservoir, flushing medium is supplied during cleaning operation to the interior of the filter housing, in particular to the filter, via the flushing medium inlet(s).

In a further configuration, a pre-separator can be connected upstream of the filter device or the multiple filter devices as viewed in a flow direction (with respect to the filter operation) of the medium to be cleaned. For example, coarse dirt particles can be separated via this pre-separator before they can enter the filter of the filter device. Such a pre-filter can in principle be of similar design to the filter device described. The described cleaning process can also be applied for cleaning a filter in the pre-separator.

Also, a micro-filter can be connected downstream of the filter device or the multiple filter devices, as viewed in the flow direction of the medium to be cleaned. Such a micro filter is suitable for filtering out the smallest particles, which may possibly pass through the filter of the filter unit without being separated, before the medium leaving the micro filter flows back to the device, for example the metal printing device.

The fan generating the flow of the medium to be filtered can be a common circulation fan. Typically, it can be a so-called centrifugal or side channel blower, with volume flows of preferably 100 $m^3/h$ to 500 $m^3/h$ (depending on the size of the installation).

Downstream of the fan in the direction of flow, furthermore, a medium cooler can be provided for cooling the circulating medium before it enters the device, in particular before it enters the enclosure of the metal printing device as process gas.

BRIEF DESCRIPTION OF THE DRAWINGS

The invention is explained below with reference to the accompanying drawing which, however, merely shows an exemplary embodiment. In the drawing.

DESCRIPTION OF THE EMBODIMENTS

Figure 1:
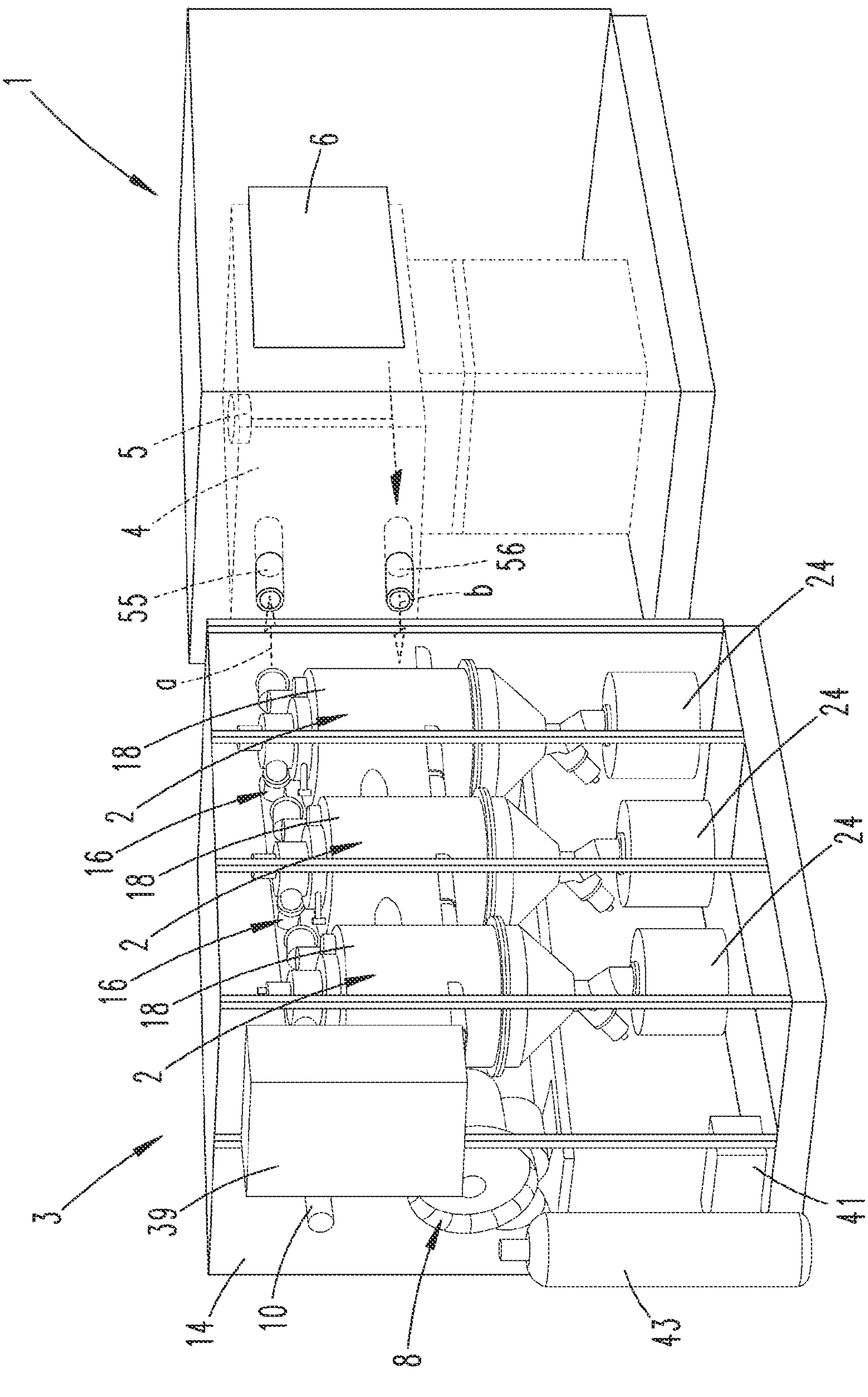
FIG. 1 shows a schematic perspective view of a metal printing device with an associated filter module, comprising multiple filter devices.

Shown and described, in the first instance with reference to FIG. 1, is a metal printing device 1 with an associated filter module 3 having a plurality of filter devices 2.

The metal printing device 1 has first and foremost an enclosure 4 in which the metal printing process can be carried out. In this case, as a result of selective laser melting, a desired component is produced layer by layer from fine metal powder under the action of a laser beam. The production can be based here directly on so-called 3D-CAD data such that fully functional components can be manufactured from high-quality metals.

In addition to the laser device 5 shown only schematically in FIG. 1, an application device for applying a metal powder layer is also substantially part of the printing device, furthermore a particle storage container as well as a particle collecting container into which excess particles can be stripped.

The production of the metal part, as is also preferred, can take place in an enclosure 4 which is closed all around, for which purpose it can be provided, if needed, with a door 6 or the like which closes the enclosure 3.

With regard to the production process, reference is made, for example, to DE 10 2017 206 792 A1 cited at the beginning.

During the printing process, regeneration of the atmosphere in the enclosure 3 is preferably carried out. For this purpose, a gaseous process gas 7, which preferably is an inert gas such as argon or nitrogen, is preferably blown into the enclosure 4 and simultaneously extracted in a circulation process. A fan 8, for example in the form of a circulation fan, is preferably used for this purpose. The fan 8 can be a so-called side-channel blower or the like.

In the exemplary embodiment shown, the fan 8 is arranged in the filter module 3 with spatial assignment to the filter devices 2.

As can also be seen in particular from the schematic illustration in FIG. 1, the fan 8 is fluidically connected to the interior of the enclosure via a pressure line 9 and a suction line 10 as well as an inlet 55 and an outlet 56.

Figure 13:
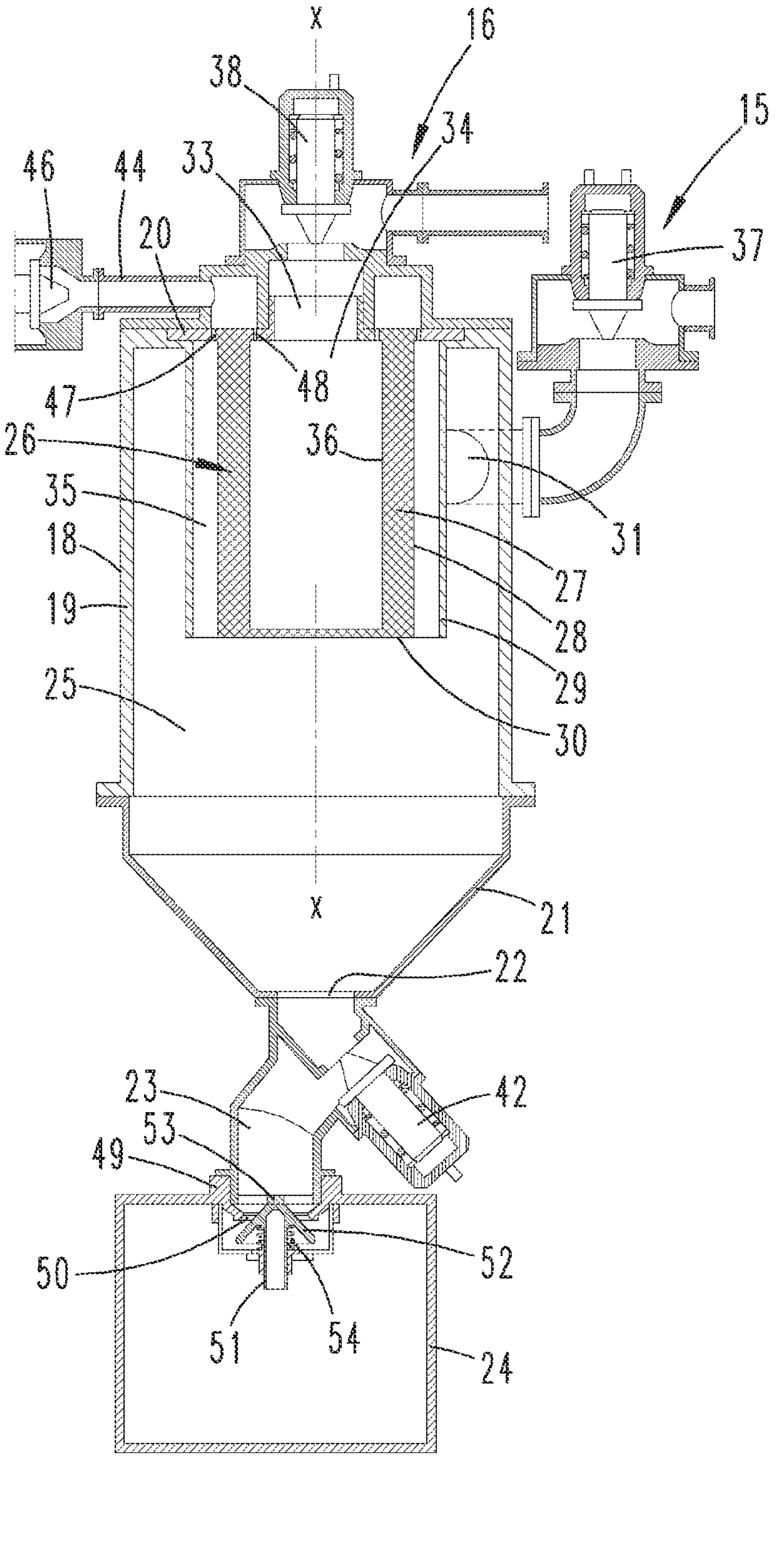
FIG. 13 shows a sectional view corresponding to FIG. 9, but after the cleaned filter device has been reintegrated in the filtering process.
Figure 14:
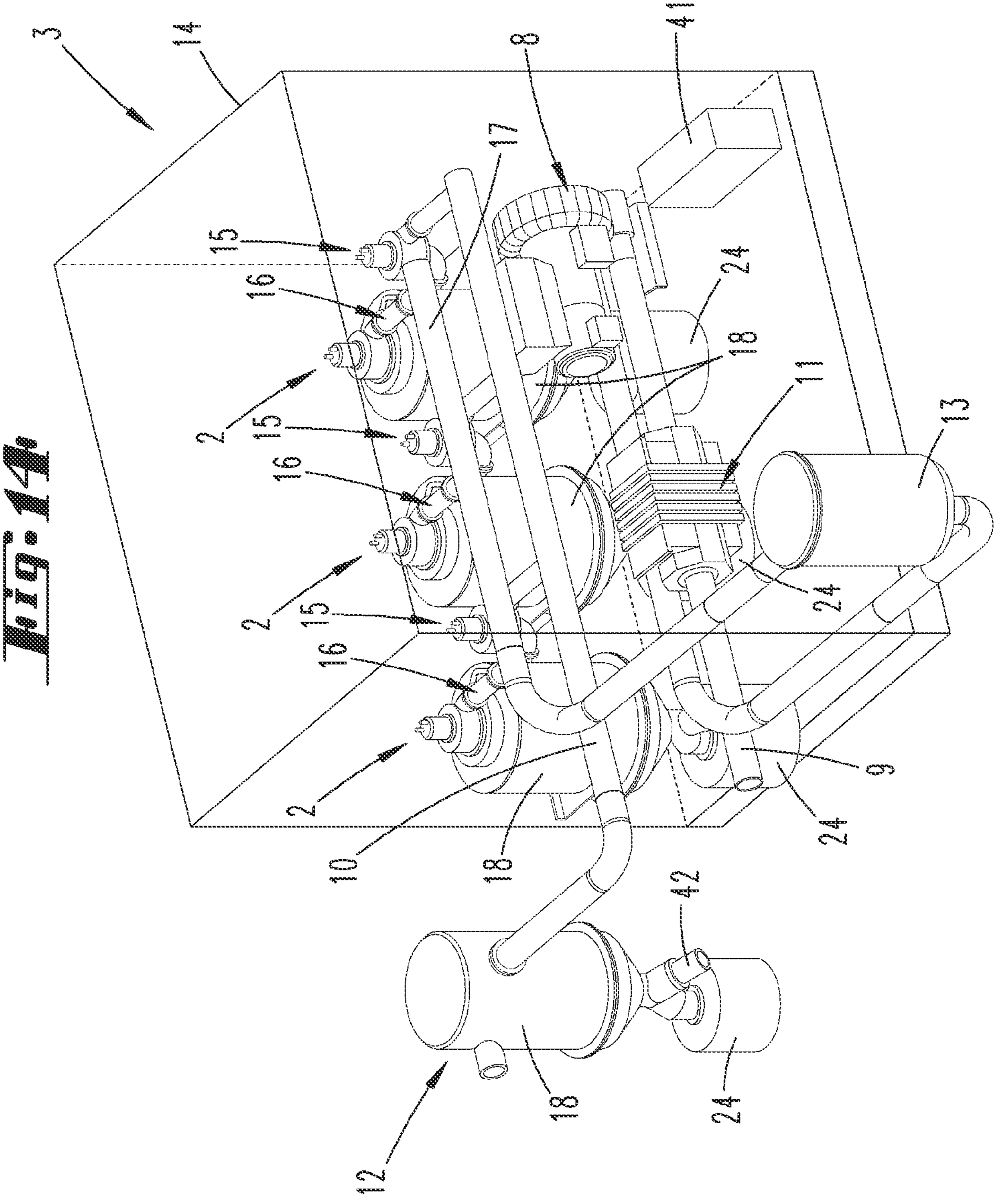
FIG. 14 shows a schematic perspective view of the filter module supplemented by an optional pre-separator and an optional micro filter.

Here, the pressure line 9 extending from the fan 8 can lead directly into the enclosure 3, if necessary, with interposition of a medium cooler 11, as shown in FIG. 13, and preferably assigned to a ceiling region of the enclosure 3. In operation, a direction a of the pressure flow of the medium 7 occurs in the pressure line 9.

At least one filter device 2 is looped into the suction line 10 upstream of the fan 8, corresponding to a direction of flow of the process gas 7. According to the exemplary embodiment shown, multiple filter devices 2, here three of them, can be provided.

The filter devices 2 together with the fan 8 and the possibly provided medium cooler 11, and furthermore, if necessary, with an optionally provided pre-separator 12 and/or a micro filter 13, can be arranged in the filter module 3 in a combined manner. This filter module 3 can include a filter housing 14 which comprises the elements described above. There may be only two interfaces associated in each case with the pressure line 9 and the suction line 10.

A possibly provided pre-separator 12 is provided upstream of the one filter device 2 or the multiple filter devices 2, as viewed in the direction of flow of the process gas 7, while the micro filter 13 is provided downstream with respect to the filter device 2 in the direction of flow.

In a usual production process and an associated process gas circulation, a direction b of the suction flow occurs in the suction line 10.

Figure 2:
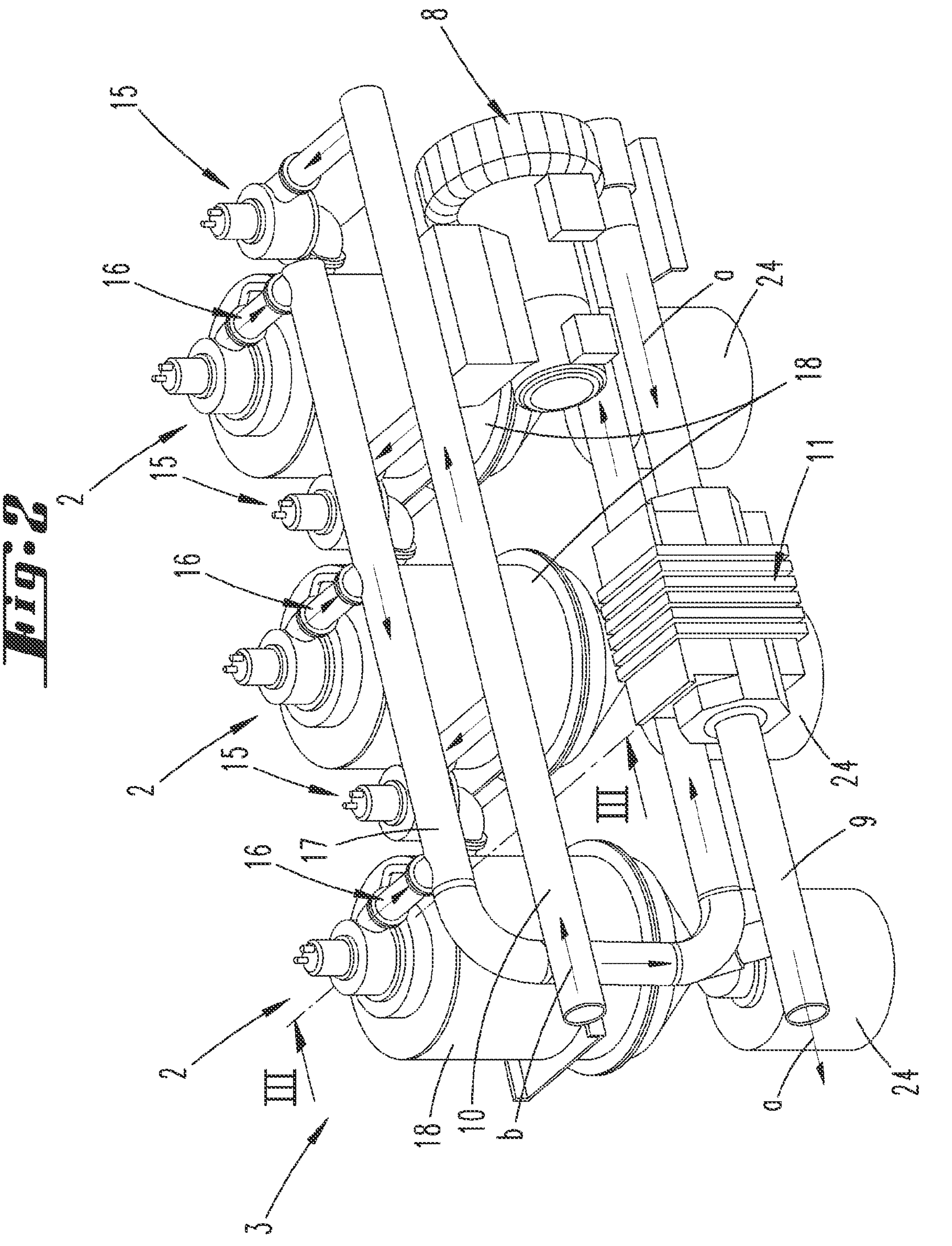
FIG. 2 shows a perspective view of the arrangement of three filter devices fluidically connected in parallel, with a circulation fan and a medium cooler.

The filter devices 2 are preferably provided in substantially identical design, in this case each having one medium inlet 15 and one medium outlet 16. Each filter device 2 is preferably directly connected to the suction line 10 via the respective medium inlet 15. The medium outlets 16 of the filter devices 2 lead into a suction transfer line 17, which leads to the fan 8, possibly with interposition of the micro filter 13 (see in particular FIG. 2).

The micro filter 13 can also be provided, for example, in the flow direction at the end of the pressure line 9, and possibly also in the flow direction downstream of the medium cooler 11.

Figure 3:
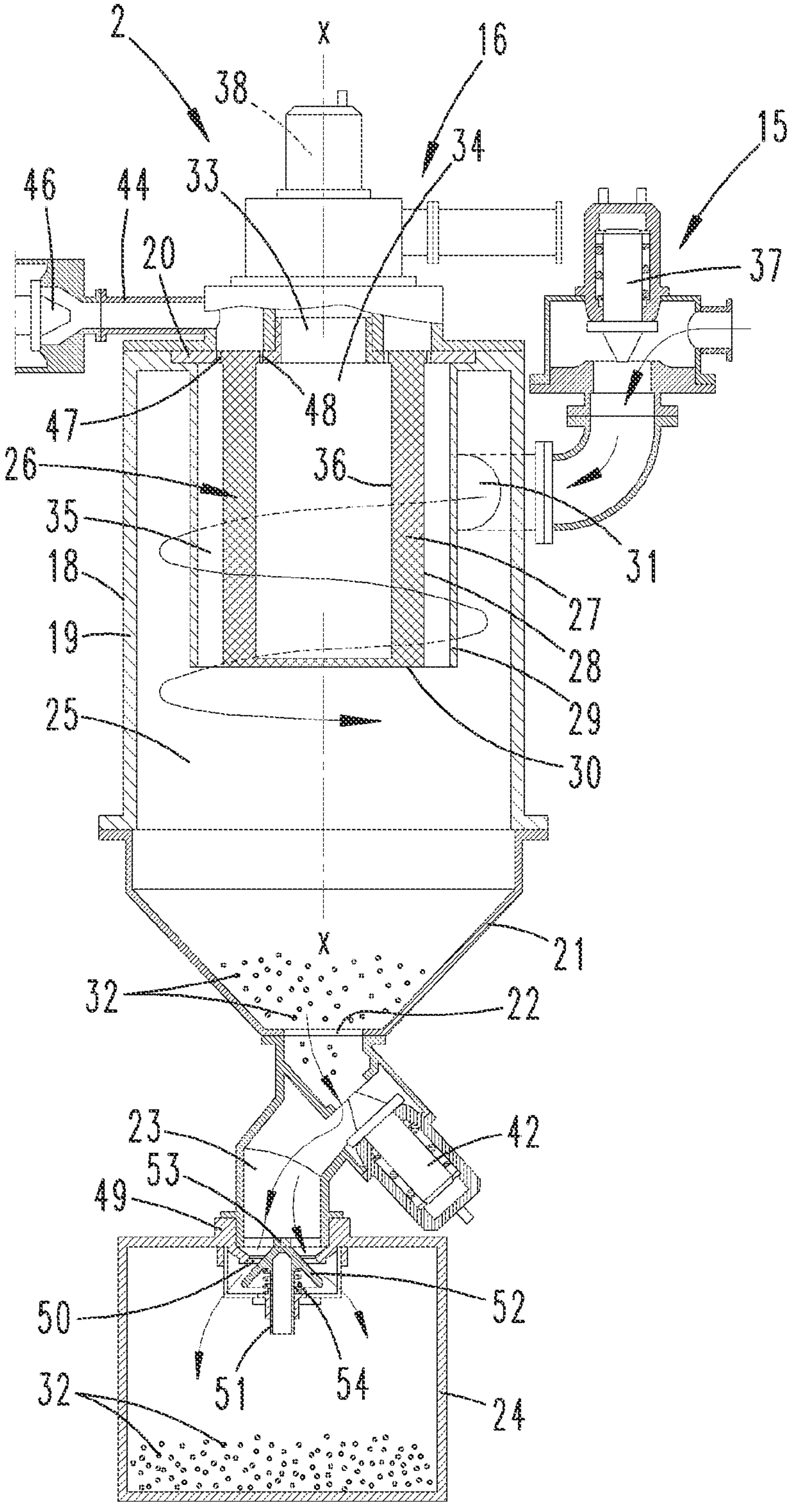
FIG. 3 shows a schematic sectional view through a filter device according to line III-III in FIG. 2, relating to a process step for filtering a medium flowing through the filter device.
Figure 4:
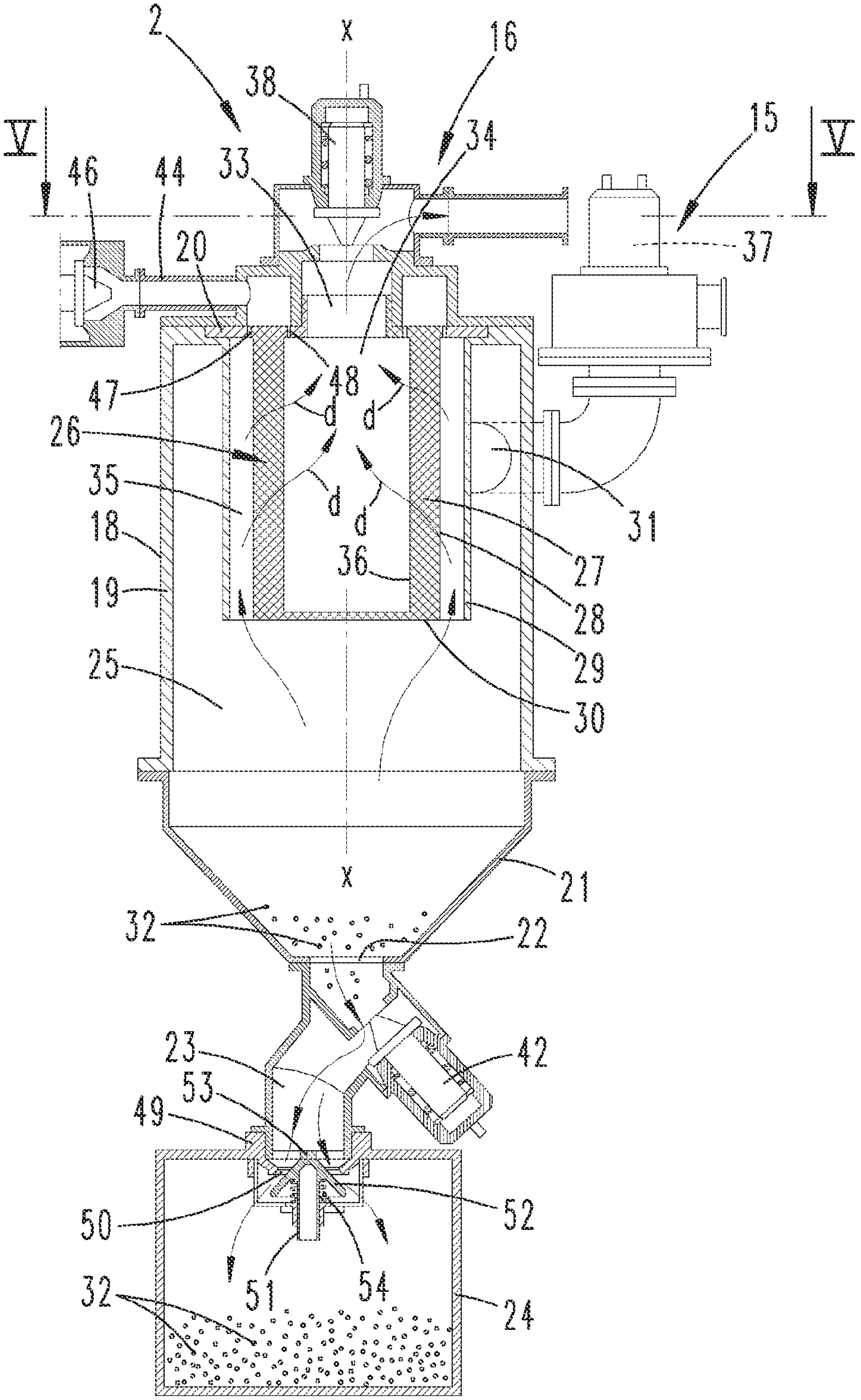
FIG. 4 shows a sectional view according to FIG. 3, but relating to an offset sectional plane.

FIGS. 3 and 4 each show a vertical sectional view—with respect to the usual operating position of the filter device 2—through one of the filter devices 2 in regeneration mode, in which filtering of the contaminated medium 7, for example smoke discharged from the enclosure 4, is carried out.

As can be seen, for example, from the sectional view in FIG. 3, the filter device 2 can have an approximately circular-cylindrical filter housing 18 with a circumferential housing wall 19 and a housing ceiling 20. The housing base 21 can be funnel-shaped with a central base opening 22 to which a transition line 23 to a filtered material collecting chamber 24, which can be removed from the filter housing 18, can be connected.

According to the illustrations, a filter 26 projecting into the interior 25 of the filter housing 18 can be arranged on the underside of the housing ceiling 20. The filter wall of the filter, as also shown, can have a tubular, circular cylindrical shape with a central longitudinal axis x which, in the usual arrangement position, is oriented along a vertical line. In accordance with the exemplary embodiment illustrated, the longitudinal axis x of the filter 26 can also form the central longitudinal axis of the filter housing 18 as a whole.

The filter 26 is surrounded at a distance from the outer surface 28 of the filter wall 27 by a guide wall 29 which is preferably aligned concentrically with respect to the longitudinal axis x. This guide wall 29, like the filter 26, is virtually suspended from the underside of the housing cover 20 and is preferably connected thereto in a flow-tight manner. Viewed in the axial direction, the annular space 35 resulting between the guide wall 29 and the filter wall 27 is formed to be open towards the interior 25, while the corresponding end face 30 of the filter 26, which points downwards in normal operation, can be formed such that it cannot be penetrated by the flow, in particular by the process gas 7. Filtered material 32 separated in this way can fall through the base opening 22 of the housing base 21 into the filtered material collecting chamber 24, solely as a result of gravity.

The inlet opening 31 of the medium inlet 15, as is also preferred, can be provided in the housing wall 19, so that an at least approximately tangential inflow of the medium 7 into the interior 25 of the filter housing 18 can arise, whereby in the first instance a vortex-like pre-separation of filtered material 32 is achieved (compare FIG. 3). Here, the filter device 2 initially acts in the manner of a cyclone separator, in which the process gas flow, starting from the inlet opening 31, is guided in a vortex-like manner in the annular space resulting between the guide wall 29 and the housing wall 19.

According to the exemplary embodiment illustrated, the outlet opening 33 of the medium outlet 16 can be provided in the region of the housing ceiling 20, in particular, as is also preferred, centrally, taking up the longitudinal axis x and furthermore being assigned to the filter interior 34 enclosed by the filter wall 27.

As a result of the suction flow arising in normal operation (filter operation) of the filter device 2, the process gas 7 sucked into the interior 25 is sucked from below into the annular space 35 between the filter wall 27 and the guide wall 29 after the vortex-like deflection assigned to the downwardly facing end face 30 of the filter 26, whereupon a penetration of the filter wall 27 from the outer surface 28 to the inner surface 36 of the filter wall 27 occurs (see arrows d in FIG. 4), so that the filtered medium 7 reaches the filter interior 34 and exits the filter device 2 via the outlet opening 33 (compare FIG. 4).

Filtered material 32 separated in this process can adhere in the filter wall 27. Any filtered material 32 that falls off through the annular space 35 in the course of this filtering process is preferably collected in the filtered material collecting chamber 24.

As can be seen from the sectional views, for example in FIGS. 3 and 4, the medium inlet 15 and the medium outlet 16 can each be provided with a shutoff valve 37 and 38, respectively, so as to remove the filter device 2 from regeneration mode after shutoff with respect to the suction line 10 and the suction transfer line 17. In such a state, the regeneration of the process gas 7 with the metal printing device 1 still being in operation is taken over solely by the further filter devices 2 of the filter module 3. In this way, at least approximately continuous operation of the metal printing device 1 can be ensured even in the event of a failure or deliberate shutoff of a filter device 2, for example for cleaning the same.

Figure 7:
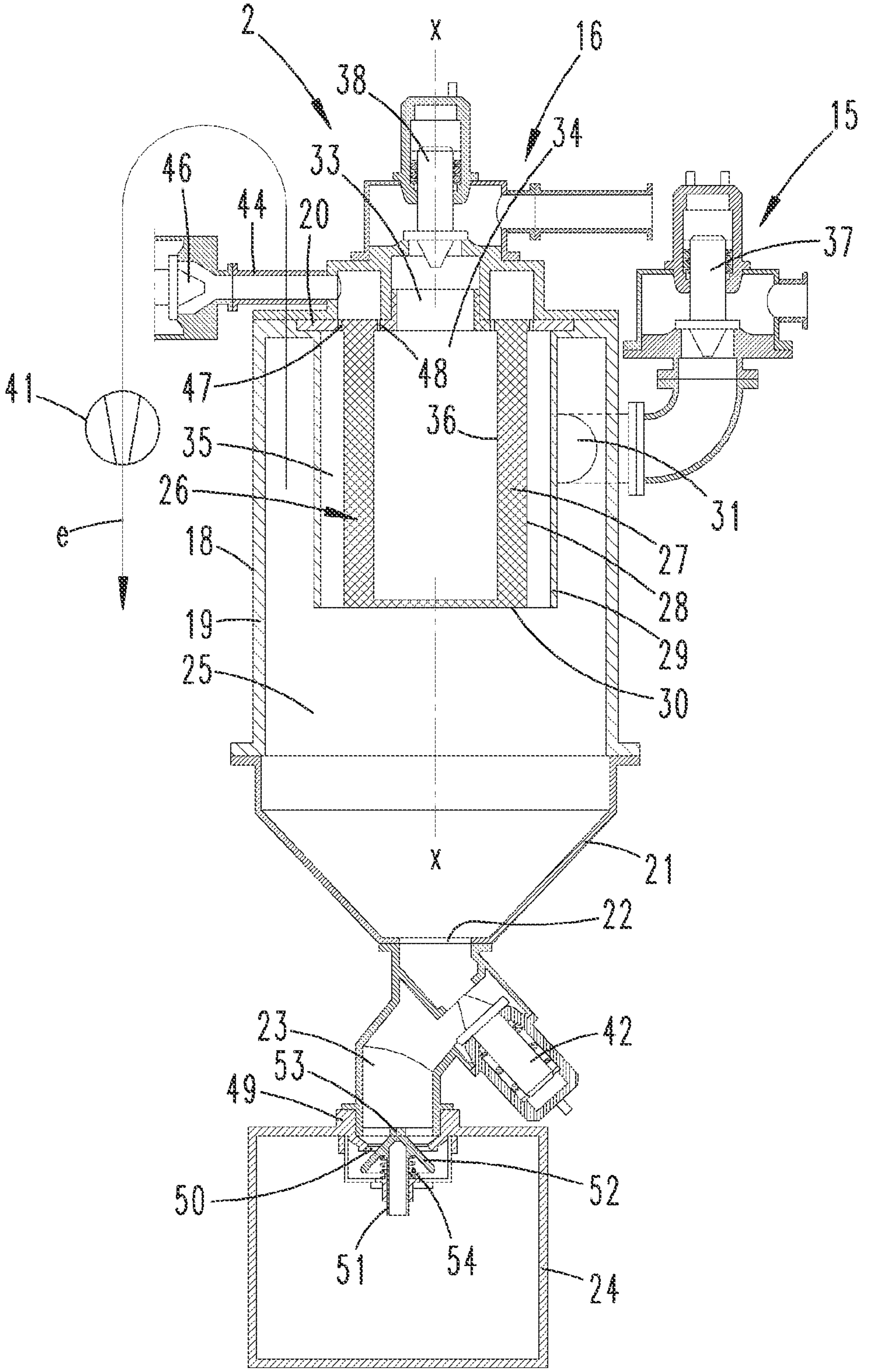
FIG. 7 shows a sectional view corresponding to FIG. 3 through the filter device, relating to a process step for evacuating the interior of a filter housing.

For this purpose, the preferably pneumatically operable shutoff valves 37 and 38 of the medium inlet 15 and the medium outlet 16 are brought into a shutoff position according to FIG. 7. The control of the shutoff valves 37 and 38 in this respect can, and preferably does, take place via control electronics 39, which are not shown in more detail and can also be part of the filter module 3.

As a result of the shutoff using the shutoff valves 37 and 38, the interior 25 of the filter device 2, preferably together with the filtered material collecting chamber 24, can be hermetically sealed off from the further components of the filter module 3, in particular from the piping provided, the further filter devices 2 and the fan 8.

Figure 6:
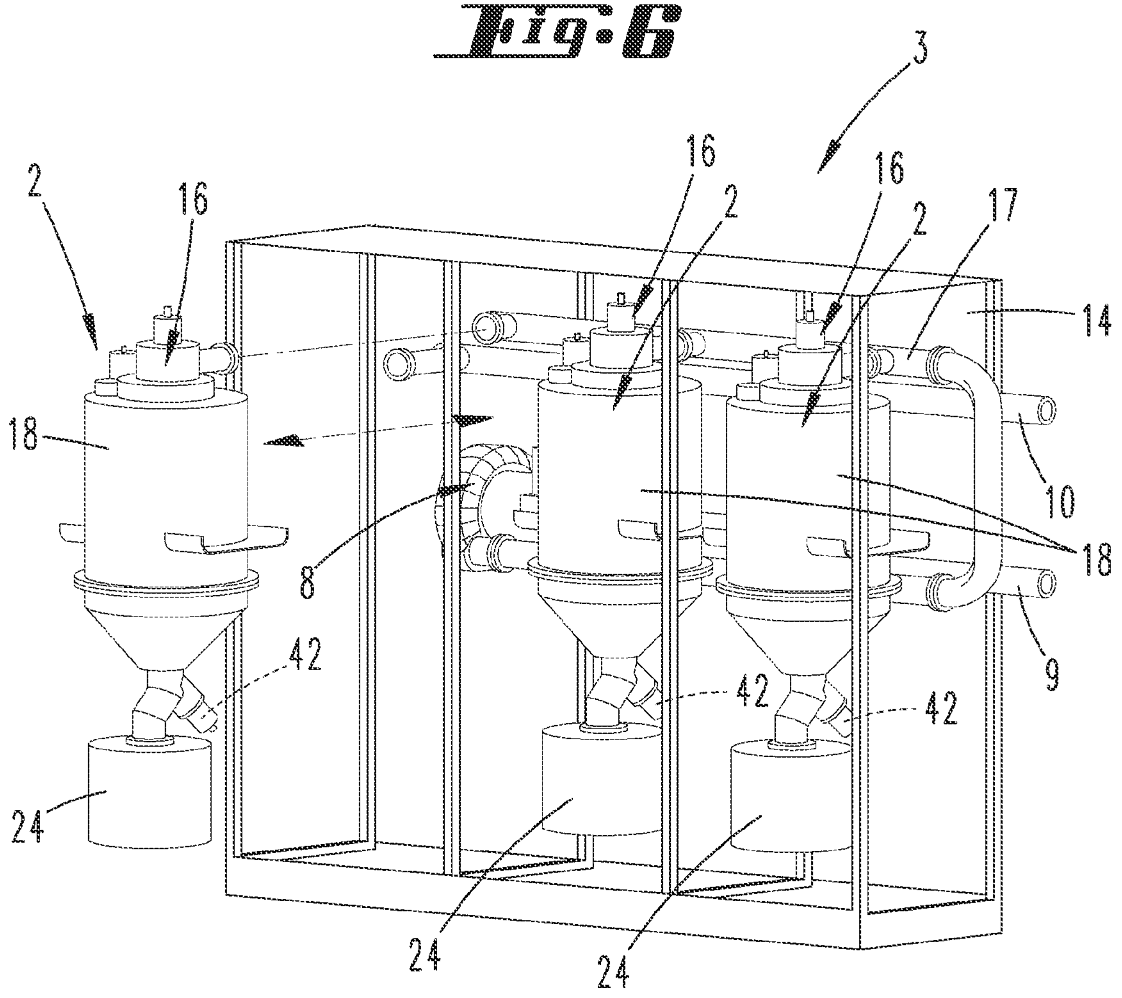
FIG. 6 shows another schematic perspective view of the filter module during a possible removal of a filter device.

In this shutoff situation, the filter device 2, as shown schematically in FIG. 6, can be removed from the filter module 3, for example for maintenance or repair work, even while filter operation is continued by the further filter devices 2. This results in a circuit-related removal in such a manner that the process gas no longer flows through the removed filter device. However, it remains of course stationary in the given arrangement.

In order to keep the volume flow of the process gas passing over the powder bed in the enclosure 4 constant or at least almost constant when a filter device 2 is removed from the overall arrangement, the fan 8 responsible for the volume flow is continuously controlled by means of an integrated volume flow measurement, in particular using the control electronics 39. Such a volume flow measurement can be carried out, for example, by means of an orifice plate and a pressure measurement upstream and downstream of the orifice plate, for example in the region of the suction transition line 17 and thus preferably in the flow direction of the medium 7 between the filter devices 2 and the fan 8.

Figure 5:
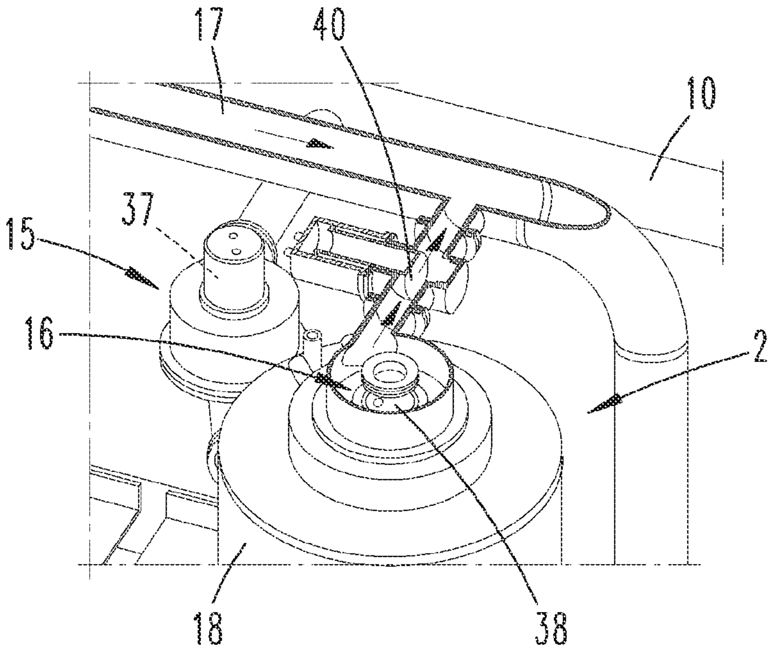
FIG. 5 shows a perspective sectional view along the line V-V in FIG. 4.

In the course of a removal of a filter device 2, the flow of process gas through the filter device 2 to be removed can be continuously reduced via a throttle valve 40, which is preferably also pneumatically controllable, in such a manner that the volume flow control can reliably readjust the circulation blower 8. Such a throttle valve 40, as is also preferred, can be provided, for example, assigned to the medium outlet 16, further preferably in a line portion between the outlet opening 33 or the valve 38 assigned to this outlet opening 33 and the suction transition line 17 (compare FIG. 5).

For cleaning the filter 26 in the filter device 2 and for removing the filter cake settling on the filter wall 27 in the course of filtering the process gas 7, the filter device 2 can be set to a regeneration mode. For this purpose, as described above, the filter device 2 is first removed from the flow of process gas or shut off from the lines by closing the shutoff valves 37 and 38 and thus closing the medium inlet 15 and the medium outlet 16.

In preparation for the cleaning process, a negative pressure is first produced in the filter housing 18 via a separate pump, in particular vacuum pump 41. In doing so, the interior 25 of the filter housing 18 and also the interior of the filtered material collecting chamber 24, which is open towards this interior 25 (see schematic illustration in FIG. 7—arrow e), are evacuated.

The vacuum pump 41, which can preferably also be part of the filter module 3, can be, as is furthermore preferred, an oil-lubricated vacuum pump, for example, such as the one known from DE 10 2015 107 721 A1.

Any filtered material particles extracted in the course of the evacuation, which have neither settled in the filter wall 27 of the filter 26 nor been separated in the filtered material collecting chamber 24, are caught in the oil tank of the vacuum pump in the case of an oil-lubricated vacuum pump 41 and disposed of with the next usual oil change.

Additionally or alternatively, a suction line acted upon by the vacuum pump 41 with respect to a direction of flow through the filter 26 can open out on the inside of the filter 26, thus, in the exemplary embodiment in an interior bounded by the filter wall 27. Thus, in this sense, the suction can take place on a clean side of the filter 26. In this way, it can be achieved that filtered material particles are practically no longer sucked in.

After a negative pressure of, for example, 500 mbar up to, for example, 1 mbar is reached in the region of the interior 25 (detectable via a pressure sensor), the suction process via the vacuum pump 41 is stopped via the control electronics 29 and a discharge valve 42 arranged, for example, in the region of the transition line 23 between the filter housing 18 and the filtered material collecting chamber 24, is then closed. The discharge valve 42 interrupts the line connection between the interior of the filter housing 18, which includes the filter 26, and the interior of the filtered material collecting chamber 24.

Figure 8:
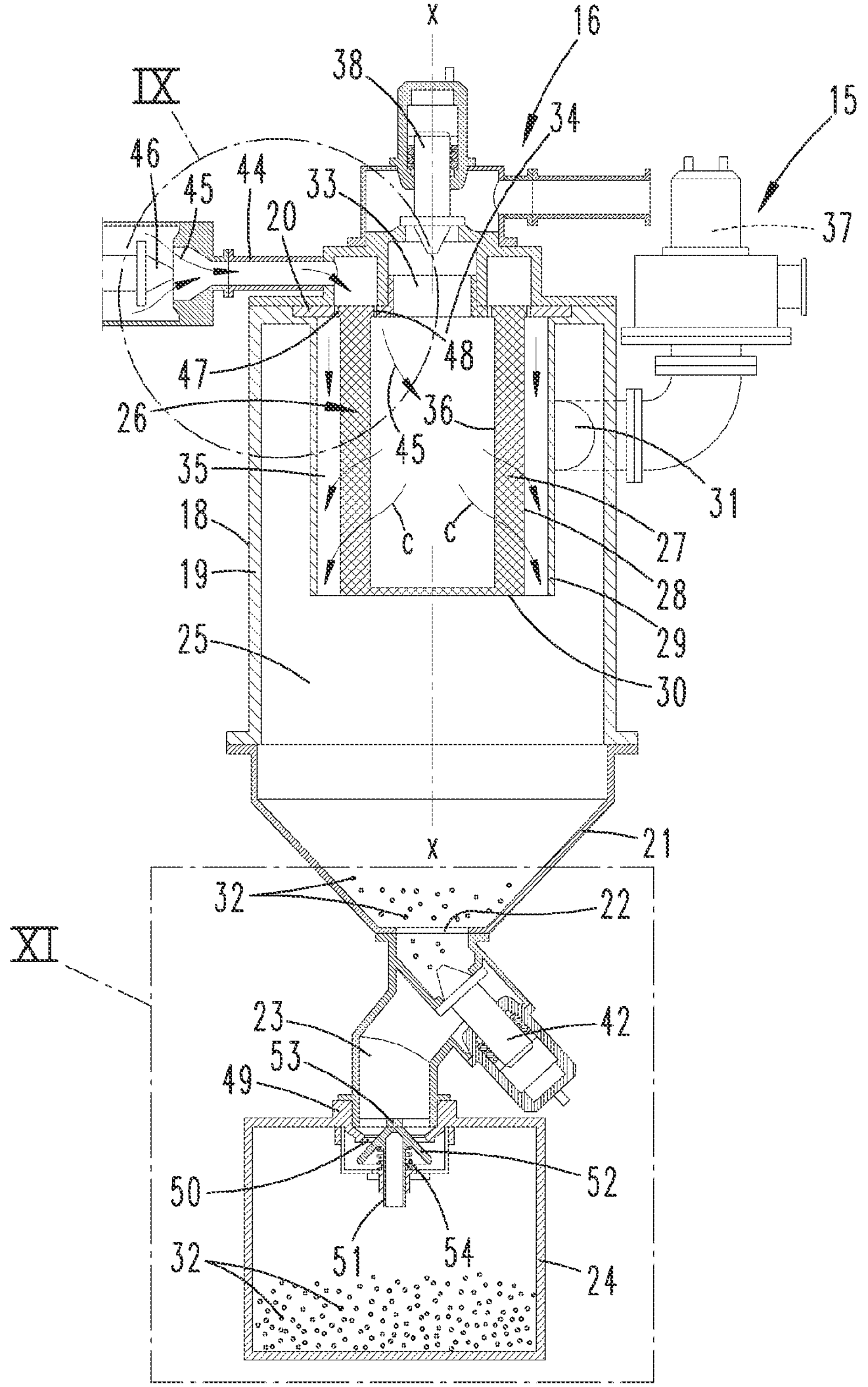
FIG. 8 shows a view in continuation of FIG. 7, relating to a process step for cleaning a filter in the filter housing of the filter device.
Figure 9:
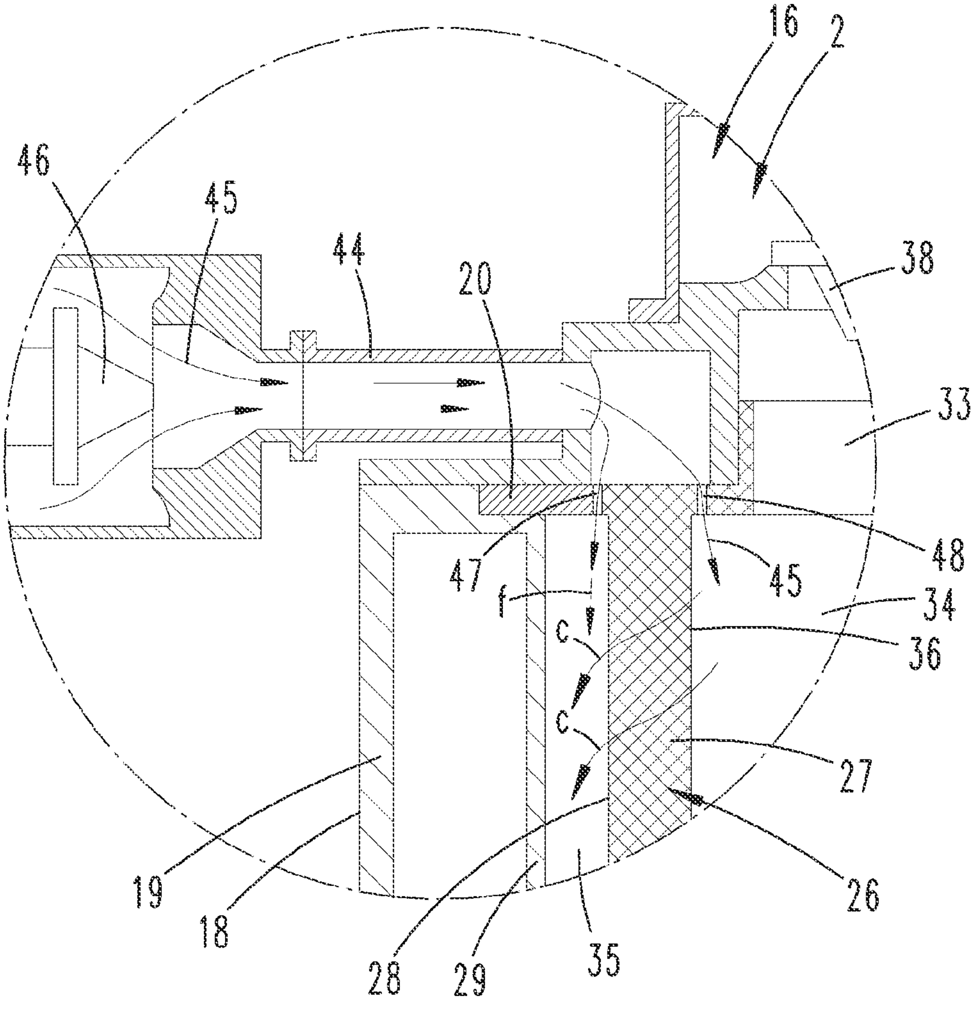
FIG. 9 shows the enlarged detail of the region IX in FIG. 8.

Via a separate flushing medium reservoir 43, which may also be part of the filter module 3, a flushing medium 45 is introduced towards the filter wall 27 via a flushing line 44 for cleaning the filter 26. Introducing the flushing medium 45 can be triggered by a preferably electrically actuated control valve 46 (see FIG. 8 and schematic illustration in FIG. 9). The control valve 46 can be controlled via the control electronics 39.

As a result of, for example, a plurality of flushing medium inlets 47 and 48 provided around the longitudinal axis x in the housing ceiling 20, the flushing medium 45 can be introduced, wherein, according to the illustrations, the flushing medium 45 is introduced into the filter interior 34 via the flushing medium inlets 48 in such a manner that it passes through the filter wall 27 in a direction c opposite to the throughflow direction of the medium 7 in normal filter operation (direction d—compare FIG. 4). Accordingly, penetration of the filter wall 27 by the flushing medium 45 from the inner surface 36 towards the outer surface 28 is thus achieved.

At the same time or also delayed with respect to the flow described above, the flushing medium 45 is introduced via the radially outer flushing medium inlet 47 substantially along the outer surface 28 of the filter wall 27 (direction f) in order thereby to reliably remove the filtered material 32, which has been loosened in particular via the flushing medium portion passing through the filter wall 27 from the inside to the outside, from the suction region towards the housing base 21.

The introduction of the flushing medium 45 can be achieved solely as a result of suction due to the negative pressure prevailing in the interior 25 of the filter housing 18 relative to the surroundings but can also be achieved in combination therewith by blowing the flushing medium 45 into the interior 25, if needed. The negative pressure in the interior 25 ensures a favorable flow of flushing medium across and through the filter wall 27.

At the end of the cleaning process, the same pressure as in the connected lines (suction line 10 and suction transfer line 17) preferably prevails again in the interior 25 of the filter housing 18, so that when the shutoff valves 37 and 38 are opened, whereby in the case of this example the reintegration of the cleaned filter device into the filter process is achieved, no backflow takes place against the usual flow direction of the process gas 7.

Preferably, the same medium is used as flushing medium 45 which is also used as process gas for removing contaminants in the enclosure 4 of the metal printing device 1. For example, argon and/or nitrogen are/is preferably used as flushing medium 45.

An integrated control system (control electronics 39) monitors the cleaning process and enables various cleaning cycles, in particular with regard to the supplied quantity of flushing medium 45 and furthermore with regard to the opening times of the control valve 46, wherein furthermore a separate control valve can be assigned to each of the flushing medium inlets 47 and 48, so that with appropriate activation of the various control valves, an adjustment of the cleaning process can also be made in this manner.

By re-evacuating, a second cleaning process can also be performed immediately after a first cleaning process, if necessary.

Upon completion of the cleaning process and the accompanying pressure equalization in the interior 25 of the filter housing 18, a pressure difference between the interior 25 and the interior of the filtered material collecting chamber 24 occurs, which, when opening the discharge valve 42, causes the filtered material 32 that was loosened during the cleaning process and preferably collected at the housing base to be sucked into the filtered material collecting chamber 24. Accordingly, the mere opening of the discharge valve 42 triggers a transfer of the loosened filtered material 32 into the collecting chamber (compare FIG. 10—arrow g). The suction process continues until the pressure between the interior 25 and the collecting chamber 24 is equalized. In addition, filtered material 32 can also trickle into the collecting chamber 24 in a gravity-dependent manner.

Figure 10:
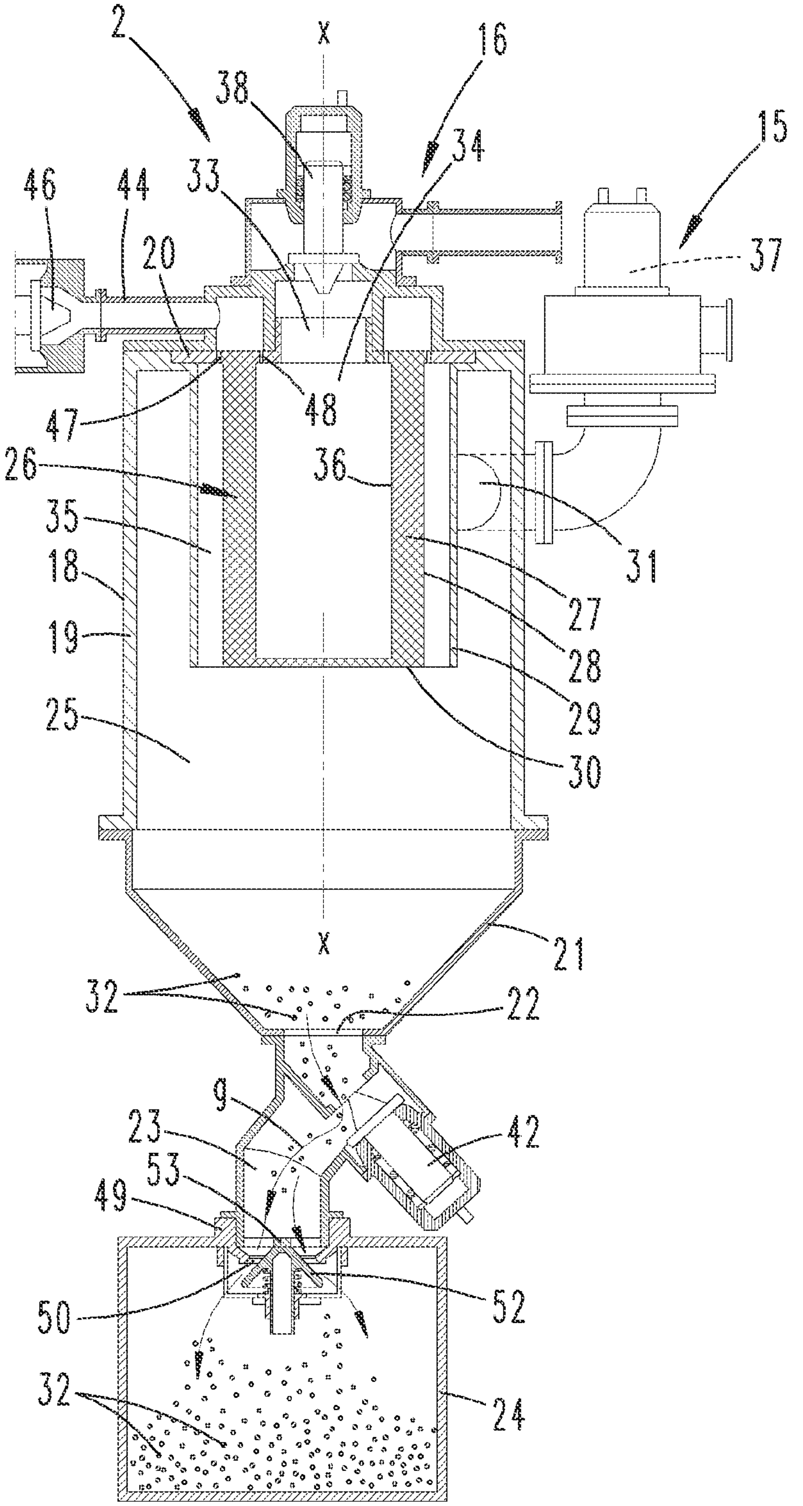
FIG. 10 shows a view in continuation of FIG. 8 after the cleaning process has been completed and filtered material has been transferred to a filtered material collecting chamber.

From this filtered material collection position according to FIG. 10, the filter device 2 can be reintroduced into the filter circuit of the filter module 3 after opening the shutoff valves 37 and 38 in the medium inlet 15 and in the medium outlet 16 (cf. FIG. 13).

Figure 11:
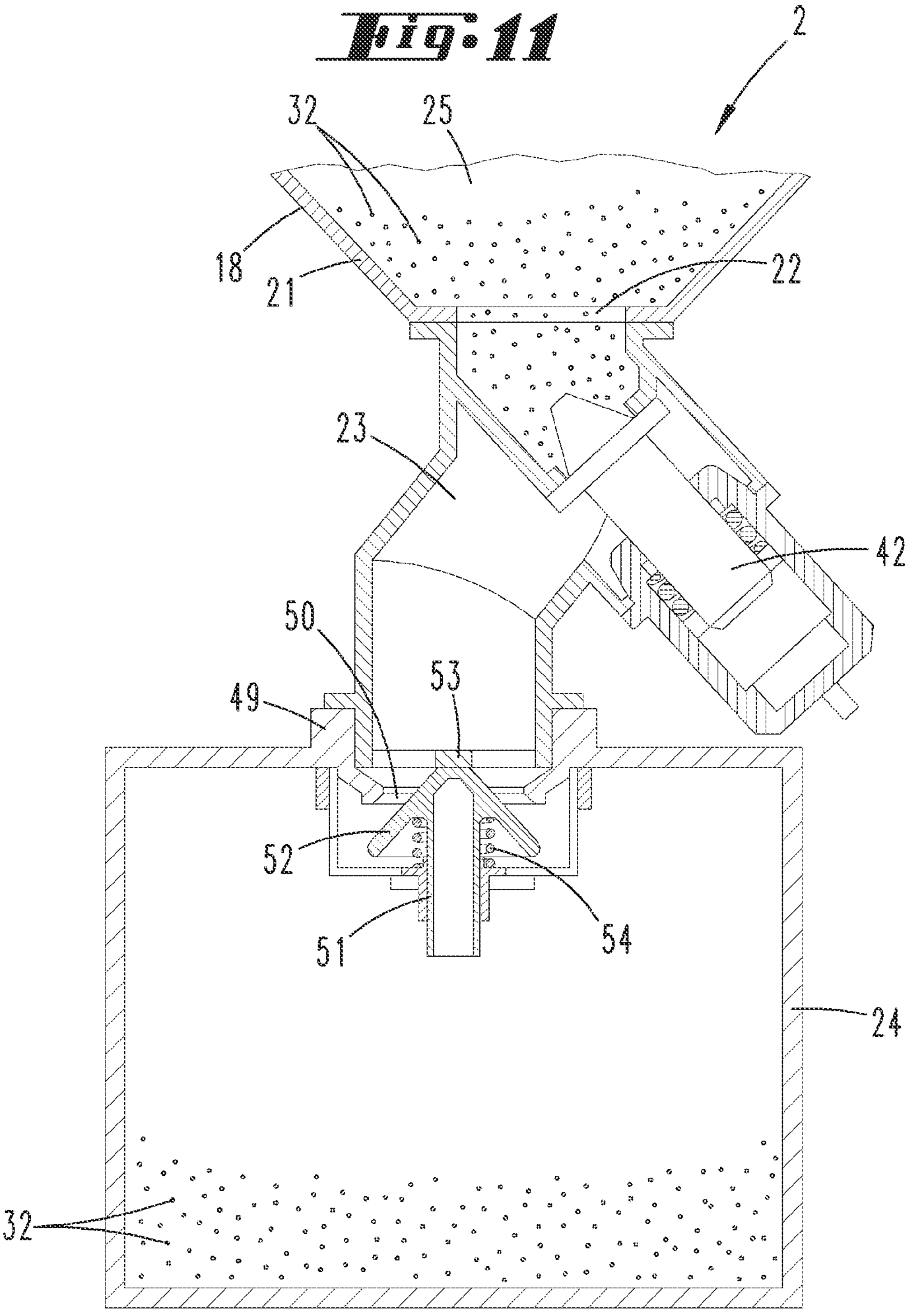
FIG. 11 shows the enlarged detail of region XI in FIG. 8.

For disposal of the filtered material 32 collected in the filtered material collecting chamber 24, the filtered material collecting chamber 24 can be removed from the filter housing 18. For this purpose, the tubular free end of the transition line 23 can be formed to receive a sleeve section 49 of the collecting chamber 24 in a flow-tight manner (compare FIGS. 11 and 12). The chamber opening 50 surrounded by the sleeve section 49 can preferably be closed by means of a shutoff valve 51. A valve cone 52 directed towards the transition line 23 can be supported according to FIG. 11 in the docking position of the collecting chamber 24 on the filter housing 18 on a holding-down means 53 in the region of the transition line 23, so that the shutoff valve 51 is held in a position exposing the chamber opening 50.

Figure 12:
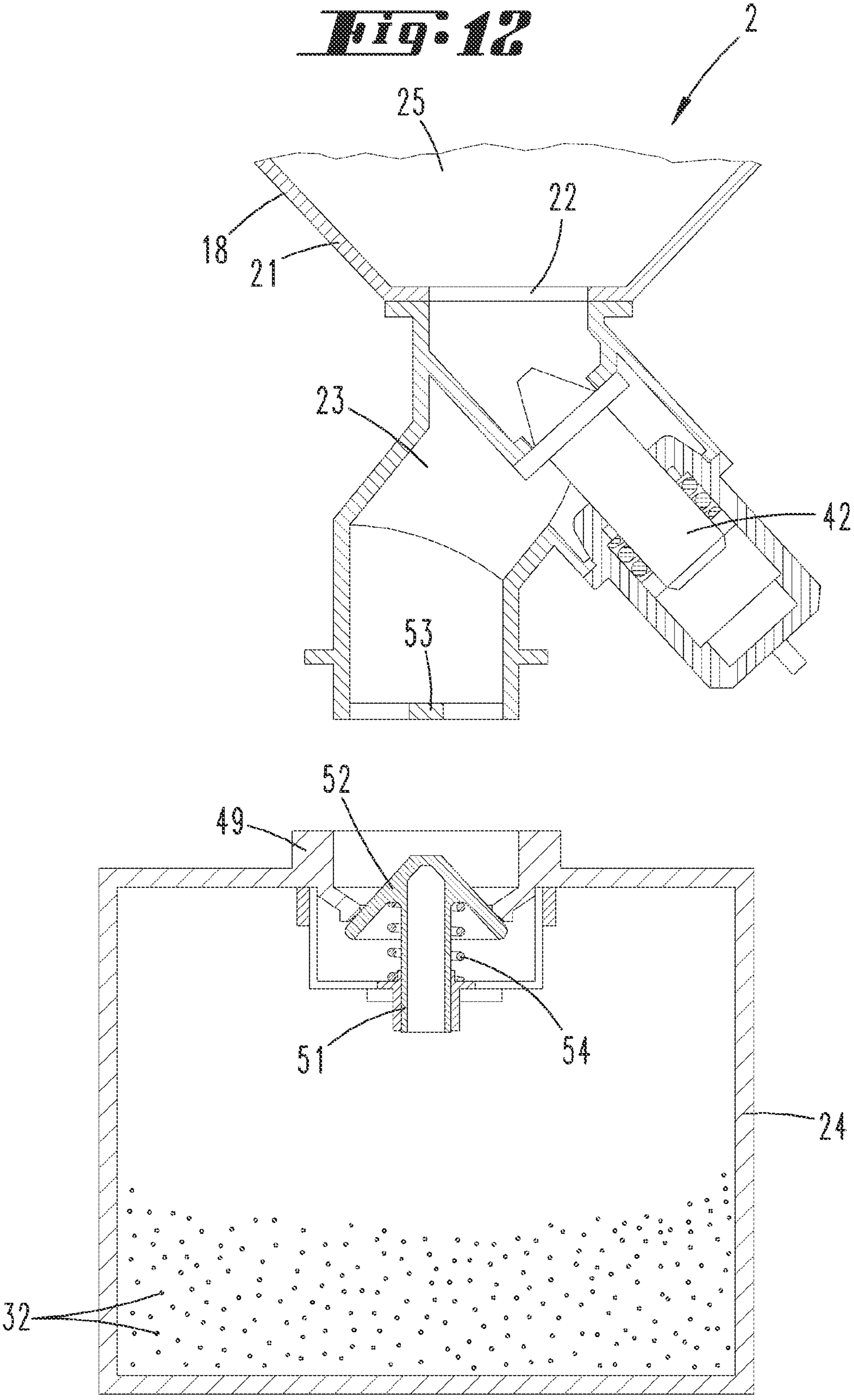
FIG. 12 shows an illustration substantially corresponding to FIG. 10, but with the filtered material collecting chamber being removed from the filter housing.

In the course of removing the filtered material collecting chamber 24 from the transition line 23, for example by unscrewing, the valve cone 52 loses its support on the holding-down means 53 of the transition line 23, as a result of which the shutoff valve 51 automatically falls into a position closing the chamber opening 50 under the action of a compression spring 54 (see FIG. 12).

Preferably, removal of the filtered material collecting chamber 24 takes place with the discharge valve 42 closed, so that when the collecting chamber is removed, the atmosphere in the interior 25, substantially formed by the medium 7, is maintained. Also, by shutting off the interior of the filtered material collecting chamber by the shutoff valve 51, the filtered material 32 accommodated therein remains under process gas atmosphere, accordingly under an atmosphere formed by the process gas 7 or the flushing medium 45.

To neutralize the filtered material 32 in the filtered material collecting chamber 24, it is also possible to flood the collecting chamber with water or oil, for example.

The flushing medium 45 and/or the medium 7 can also be used for pneumatic valve actuation, in particular of the shutoff valves 37 and 38, and furthermore, if necessary, of the throttle valves 40.

Via electronic interfaces to the electronic control of the metal printing device 1, the subsystem resulting from the filter module 3 can be optimally integrated into the overall control of the metal printing device 1.

Insofar as reference is made above to process gas, the process gas may be a different medium if the filter device is used in connection with a different medium to be cleaned, that is, in particular, if it is used in a context other than that of a metal printing device.

REFERENCE LIST

1 metal printing device
2 filter device
3 filter module
4 enclosure
5 laser device
6 door
7 medium
8 circulation fan
9 pressure line
10 suction line
11 medium cooler
12 pre-separator
13 micro filter
14 housing
15 medium inlet
16 medium outlet
17 suction transition line
18 filter housing
19 housing wall
20 housing ceiling
21 housing base
22 base opening
23 transition line
24 filtered material collecting chamber
25 interior
26 filter
27 filter wall
28 outer surface
29 guide wall
30 end face
31 inlet opening
32 filtered material
33 outlet opening
34 filter interior
35 annular space
36 inner surface
37 shutoff valve
38 shutoff valve
39 control electronics
40 throttle valve
41 vacuum pump
42 discharge valve
43 flushing medium reservoir
44 flushing line
45 flushing medium
46 control valve
47 flushing medium inlet
48 flushing medium inlet
49 sleeve portion
50 chamber opening
51 shutoff valve
52 valve cone
53 holding-down means
54 compression spring
55 inlet
56 inlet
a direction
b direction
c direction
d direction
e arrow
f direction
g arrow
x longitudinal axis

The invention claimed is:

1. A filter device for a metal printing device comprising an enclosure, wherein the metal printing is carried out in the enclosure, the filter device comprising:

a filter housing with a filter located therein for a medium to be filtered in a filter operation of the filter device, a medium inlet and a medium outlet for the medium to be filtered, a vacuum pump connected to the filter housing, wherein the medium inlet comprises a shutoff valve which has an open and a closed position, wherein the medium outlet comprises a shutoff valve which has an open and a closed position, wherein, in a shutoff state, the shutoff valve of the medium inlet and the shutoff valve of the medium outlet are in the closed position, wherein, in the shutoff state, an interior of the filter housing comprising the filter is shut off from the medium inlet and the medium outlet and is evacuated by the vacuum pump to produce a negative pressure in the interior of the filter housing, a filtered material collecting chamber configured to be subjected to negative pressure together with the filter housing, the filtered material collecting chamber being assigned to the filter housing and being configured for receiving and storing filtered material that has been removed from the filter, and a discharge valve disposed between the filtered material collecting chamber and the filter, the discharge valve being configured for shutting off the filtered material collecting chamber to maintain the negative pressure therein while a flushing medium is introduced into the filter housing, wherein the filter device is configured such that, after a pressure equalization in the filter housing by the flushing medium, the discharge valve is opened to feed the filtered material into the filtered material collecting chamber by means of the negative pressure maintained in the filtered material collecting chamber.

2. A filter device for a metal printing device comprising an enclosure, wherein the metal printing is carried out in the enclosure, wherein the filter device comprises:

a filter housing with a filter located therein for a medium to be filtered in a filter operation of the filter device, a medium inlet and a medium outlet for the medium to be filtered, and a flushing medium inlet that is configured to be shut off, and which is configured for introducing a flushing medium into an interior of the filter housing in a cleaning operation, wherein the flushing medium inlet is configured to cause the flushing medium to flow through the filter in a direction opposite to the filter operation, for cleaning the filter in the cleaning operation of the filter device, and a filtered material collecting chamber assigned to the filter housing and being configured for receiving and storing the filtered material that has been removed from the filter, the filtered material collecting chamber being removable from the filter housing comprising the filter via a transition line, wherein the filtered material collecting chamber comprises a shutoff valve, the shutoff valve being configured for shutting off the filtered material collecting chamber, wherein the shutoff valve comprises a valve cone which, in an arranged position of the filtered material collecting chamber on the filter housing, is supported against a holder provided in the region of the transition line so that the shutoff valve is held in a valve-open position, and wherein upon removal of the filtered material collecting chamber from the filter housing, the valve cone loses its support against the holder such that the shutoff valve is automatically closed in a spring-supported manner to hermetically enclose an inert gas atmosphere within the filtered material collecting chamber.

3. The filter device according to claim 1, wherein the filter device is configured such that introducing a flushing medium into the housing interior in the cleaning operation can be carried out by a reduction of negative pressure to equalize pressure in the filter housing.

4. The filter device according to claim 1, wherein the filter device is configured such that the filtered material collecting chamber together with the filter housing can be subjected to negative pressure.

5. The filter device according to claim 2, wherein a discharge valve is provided between the filtered material collecting chamber and the filter, the discharge valve being arranged at the filter housing and positioned upstream of the transition line, wherein the discharge valve is configured for shutting off the filter housing towards the environment when the filtered material collecting chamber is detached, such that the filtered material collecting chamber is sealed by its shutoff valve and the filter housing is separately sealed by the discharge valve.

6. The filter device according to claim 1, wherein the filtered material collecting chamber is removable from the filter housing.

7. The filter device according to claim 2, wherein in the cleaning operation the flushing medium inlet is further configured to cause a flow of the flushing medium onto a side of a filter wall representing an outer surface of the filter wall in the filter operation.

8. The filter device according to claim 1, wherein the filter device is configured such that after pressure equalization in the filter housing by an inflowing flushing medium, an access to the filtered material collecting chamber can be opened for feeding filtered material into the filtered material collecting chamber.

9. The filter device according to claim 8, wherein feeding the filtered material into the filtered material collecting chamber is carried out by suction.

10. The filter device according to claim 1, wherein a controllable throttle valve is arranged in the medium outlet.

11. The filter device according to claim 2, wherein two flushing medium inlets are provided, one of which is configured to direct the flushing medium to pass through a filter wall in a direction opposite to the filter operation, and one of which is configured to direct the flushing medium onto an outer surface of a filter wall.

12. The filter device according to claim 11, wherein each flushing medium inlet is assigned a control valve.

13. The filter device according to claim 12, wherein the control valve is electrically operable.

14. The filter device according to claim 1, wherein each shutoff valve is a pneumatic valve.

15. The filter device according to claim 14, wherein by using a flushing medium, the pneumatic valves are operable.

16. The filter device according to claim 1, wherein two or more filter devices each having one filter are provided.

17. The filter device according to claim 16, wherein the two or more filter devices are operable in parallel.

18. The filter device according to claim 16, wherein one of the filter devices can be shut off for cleaning.

19. The filter device according to claim 18, wherein the shut off filter device is operable with a flushing medium for cleaning the filter.

20. The filter device according to claim 16, wherein a separate flushing medium reservoir is assigned to at least one of the two or more filter devices.

21. The filter device according to claim 16, wherein a pre-separator is connected upstream of the two or more filter devices as viewed in the flow direction of the medium to be filtered.

22. The filter device according to claim 16, wherein a micro filter is connected downstream of the two or more filter devices as viewed in the flow direction of the medium to be filtered.

23. The filter device according to claim 2, wherein a flow of the medium to be filtered is achievable by a fan.

24. The filter device according to claim 23, wherein a medium cooler is provided downstream of the fan in the direction of flow.

* * * * *